US012631321B1

(12) United States Patent
Jin et al.

(10) Patent No.: US 12,631,321 B1
(45) Date of Patent: May 19, 2026

(54) WATERPROOF LAMP HEAD

(71) Applicant: Linhai Shencheng Christmas Light Factory, Linhai City (CN)

(72) Inventors: Longjun Jin, Linhai City (CN); Longcheng Jin, Linhai City (CN)

(73) Assignee: Linhai Shencheng Christmas Light Factory, Linhai City (CN)

( * ) Notice: Subject to any disclaimer, the term of this patent is extended or adjusted under 35 U.S.C. 154(b) by 0 days.

(21) Appl. No.: 19/212,486

(22) Filed: May 19, 2025

(30) Foreign Application Priority Data

Feb. 20, 2025 (CN) ........................ 202520275371.4

(51) Int. Cl.

| | |
|---|---|
| ***F21V 31/00*** | (2006.01) |
| ***F21V 17/10*** | (2006.01) |
| ***F21V 19/00*** | (2006.01) |
| ***F21V 23/00*** | (2015.01) |
| ***F21Y 115/10*** | (2016.01) |

(52) U.S. Cl.
CPC .......... *F21V 31/005* (2013.01); *F21V 17/101* (2013.01); *F21V 19/003* (2013.01); *F21V 23/001* (2013.01); *F21Y 2115/10* (2016.08)

(58) Field of Classification Search
CPC .... F21V 31/005; F21V 17/101; F21V 19/003; F21V 23/001
See application file for complete search history.

(56) References Cited

U.S. PATENT DOCUMENTS

| | | | | |
|---|---|---|---|---|
| 9,285,109 | B1 * | 3/2016 | Olsson | F21V 29/70 |
| 2007/0139913 | A1 * | 6/2007 | Savage | F21V 15/01 362/101 |
| 2011/0074291 | A1 * | 3/2011 | Osawa | F21V 3/00 315/32 |
| 2013/0058080 | A1 * | 3/2013 | Ge | F21K 9/27 362/249.02 |
| 2019/0242570 | A1 * | 8/2019 | Brabec | F21V 7/0008 |
| 2020/0166182 | A1 * | 5/2020 | Yeung | H10H 20/857 |
| 2022/0260244 | A1 * | 8/2022 | Selak | F21K 9/232 |
| 2022/0397266 | A1 * | 12/2022 | De Boer | F21V 31/005 |
| 2024/0426437 | A1 * | 12/2024 | Wang | F21V 23/06 |
| 2025/0020291 | A1 * | 1/2025 | Lei | F21V 31/005 |
| 2025/0035273 | A1 * | 1/2025 | Zhang | F21V 17/06 |

* cited by examiner

*Primary Examiner* — Bryon T Gyllstrom

(57) ABSTRACT

A waterproof lamp head, including: a lamp core holder, a lamp holder, and a light-transmitting cover. The lamp core holder is arranged with an LED lamp board; the lamp core holder is further arranged with a lead wire, an end of the lead wire passing through the lamp core holder and being connected to the LED lamp board. The lamp holder is integrally injection molded on an outer side of the lamp core holder and on an outer side of the lead wire; the lamp holder defines a through hole for the lead wire to pass through. The light-transmitting cover is ultrasonically welded to the lamp core holder; a sealed space is defined between the light-transmitting cover and the lamp core holder to mount the LED lamp board.

14 Claims, 3 Drawing Sheets

WATERPROOF LAMP HEAD

CROSS-REFERENCE TO RELATED APPLICATIONS

The present application claims the priority of Chinese patent application No. 202520275371.4, filed on Feb. 20, 2025, and the entire contents of which are hereby incorporated by reference in its entirety.

TECHNICAL FIELD

The present disclosure relates to the technical field of lighting fixtures, and more specifically to a waterproof lamp head.

BACKGROUND

Lamps serve dual functions of illumination and decoration, acting as essential tools for nighttime lighting and enhancing festive atmospheres during significant occasions such as Christmas. During this season, multiple lamp heads are often interconnected in series or parallel configurations to form decorative light strings that elevate visual appeal.

A subset of these lamp heads is typically deployed outdoors, necessitating robust waterproof performance. For instance, Chinese Patent No. CN220524076U discloses a Christmas lamp head, with an illumination core assembly including a transparent lampshade, a surface-mounted lamp board, and a fixing base. The design employs potting adhesive injected into the transparent lampshade to seal and waterproof the junction between the lamp board and its connecting wires, thereby preventing water ingress through mounting holes. However, this potting adhesive method not only introduces procedural complexity but also requires extended drying periods between manufacturing stages, which significantly impedes production efficiency.

SUMMARY OF THE DISCLOSURE

The purpose of the present disclosure is to address the aforementioned technical issues and provide a waterproof lamp head that achieves simple molding processes and high production efficiency.

A waterproof lamp head, including:

a lamp core holder, arranged with an LED lamp board; wherein the lamp core holder is further arranged with a lead wire, an end of the lead wire passing through the lamp core holder and being connected to the LED lamp board;

a lamp holder, integrally injection molded on an outer side of the lamp core holder and on an outer side of the lead wire; wherein the lamp holder defines a through hole for the lead wire to pass through; and a light-transmitting cover, ultrasonically welded to the lamp core holder; wherein a sealed space is defined between the light-transmitting cover and the lamp core holder to mount the LED lamp board.

In some embodiments, the lamp core holder includes:

a base; and a mounting column; wherein an end of the mounting column is integrally formed on the base, and another end of the mounting column is configured to mount the LED lamp board;

wherein the end of the lead wire passes through the base and the mounting column in sequence and is connected to the LED lamp board.

In some embodiments, the lamp core holder further includes:

a positioning column, integrally formed on the other end of the mounting column; wherein the LED lamp board defines a through hole matching the positioning column;

wherein the positioning column is fixedly connected to the LED lamp board after hot melting.

In some embodiments, the mounting column internally defines an axial hole for the lead wire to pass through and a radial hole for the lead wire to exit;

the axial hole is coaxially arranged with the through hole.

In some embodiments, the radial hole includes two radial holes that are symmetrically inclined, with a smooth transition at connection points with the axial hole.

In some embodiments, a surface of the mounting column defines a slot hole in communication with the through hole.

In some embodiments, a surface of the LED lamp board near the mounting column is arranged with a solder joint for connecting to the lead wire.

In some embodiments, the base is arranged with a ring-shaped protrusion, and a ring-shaped groove is defined on the ring-shaped protrusion;

an end of the light-transmitting cover is embedded in the ring-shaped groove.

In some embodiments, the end of the light-transmitting cover disposed within the ring-shaped groove is arranged with a ring-shaped reinforcing rib.

In some embodiments, the waterproof lamp head is formed by:

1). integrally injection-molding the lamp core holder;

2). mounting the LED lamp board on the positioning column, and performing hot melting on the positioning column to fix the LED lamp board to the mounting column;

3). mounting the lead wire, by passing the end of the lead wire sequentially through the base and the mounting column, and connecting the end to the LED lamp board;

4). placing the lamp core holder with the lead wire into a mold of a vertical injection molding machine, and integrally injection molding the lamp holder around the lead wire and the lamp core holder; and 5). welding the light-transmitting cover to the ring-shaped groove of the lamp core holder with an ultrasonic welding machine.

The beneficial effects of the present disclosure are as follows.

1. By integrally injection molding the lamp holder on the outer side of the lamp core holder and the outer side of the lead wire, water penetration through the base into the lamp core may be effectively prevented, thereby ensuring reliable sealing and waterproof performance. Additionally, the light-transmitting cover is ultrasonically welded to the lamp core holder, thereby further ensuring waterproof performance while simplifying the production process and effectively improving production efficiency.

2. By arranging the LED lamp board using the positioning column, the mounting stability of the LED lamp board is effectively improved, ensuring product quality and service life. The LED lamp board is fixed in place using hot melting, and the wire lead is secured through the axial hole, the radial hole, or the slot hole, thereby further enhancing the mounting stability of the LED lamp board.

3. By embedding the light-transmitting cover into a ring-shaped groove, the connection strength between the light-transmitting cover and the base is effectively ensured, along with the sealing and waterproofing of the connection points. This further prevents water from entering the light-transmitting cover, thereby avoiding safety hazards and extending the service life of the lamp head.

Figure 1:
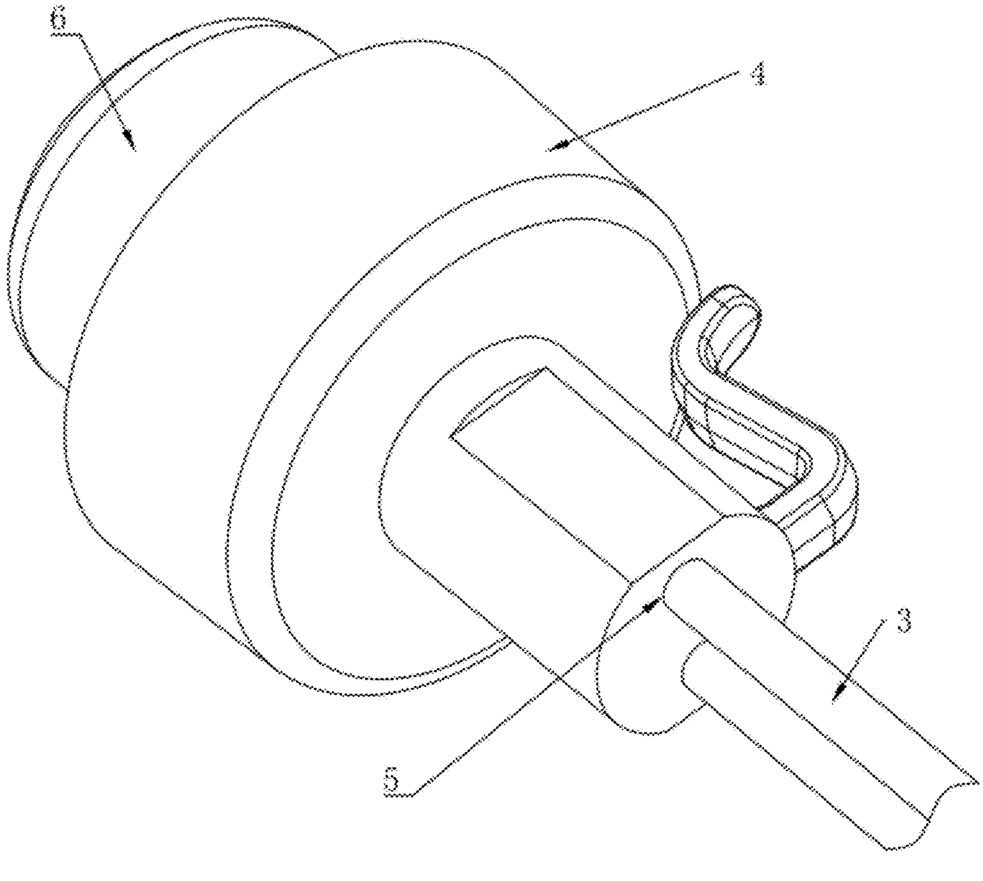
FIG. 1 is a structural schematic view according to some embodiments of the present disclosure.
Figure 2:
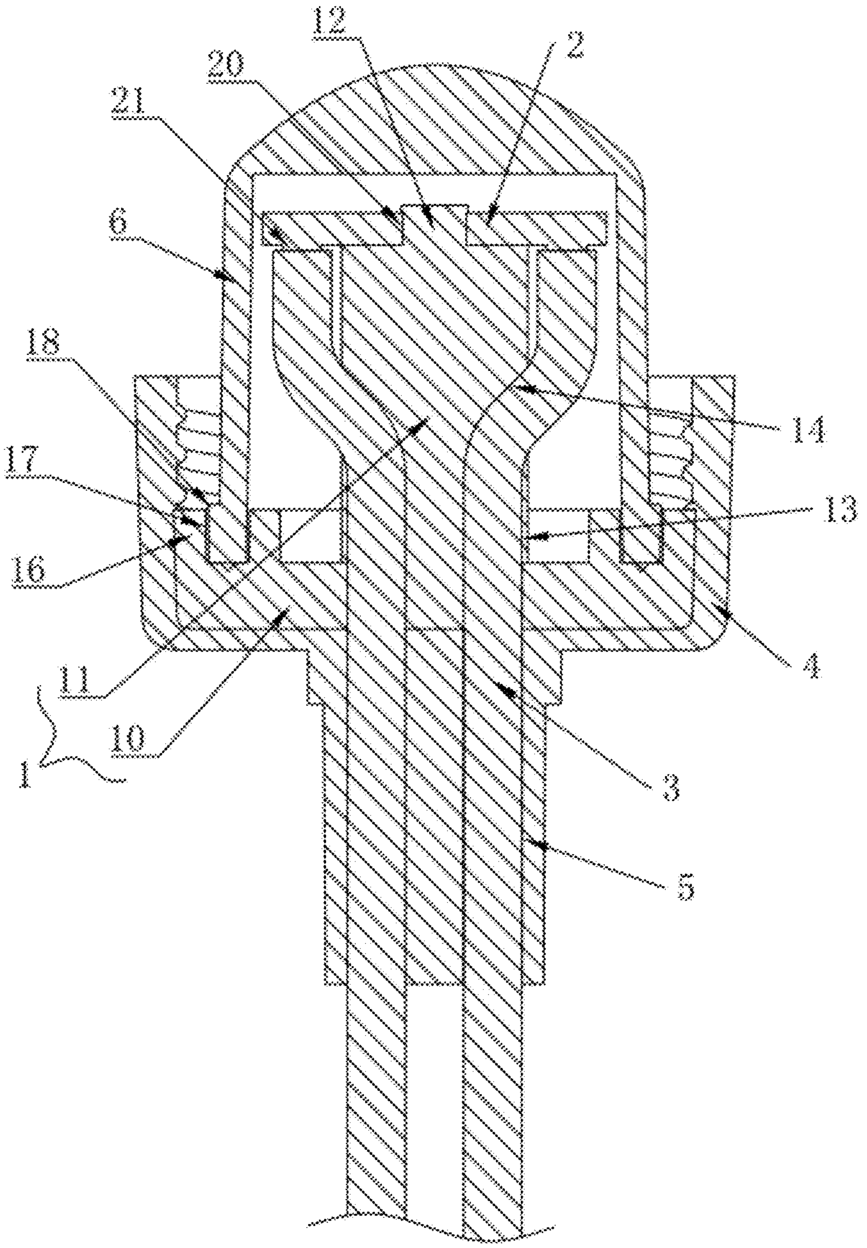
FIG. 2 is a structural schematic view according to Implementation 5 of the present disclosure.
Figure 3:
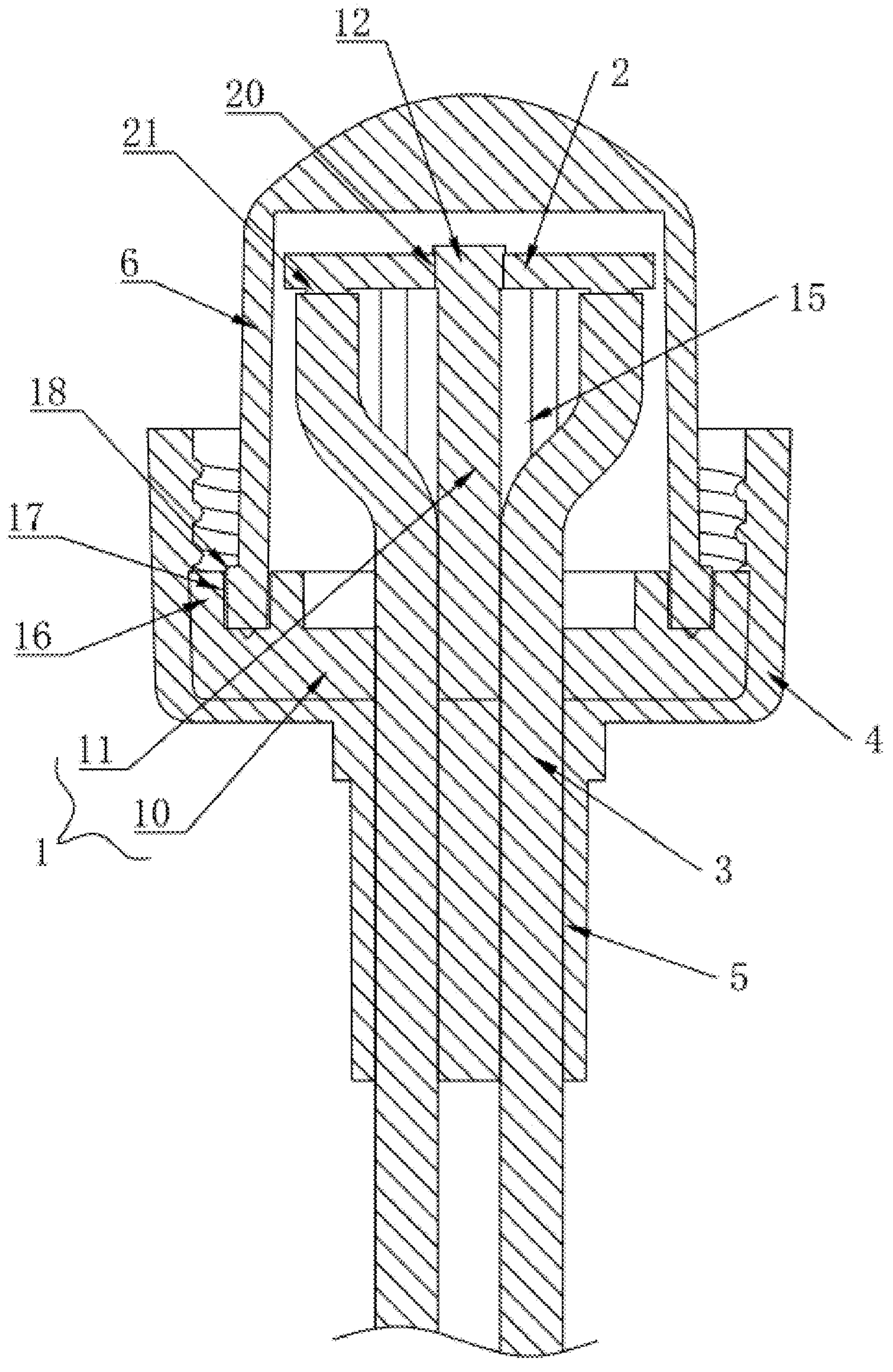
FIG. 3 is a structural schematic view according to Implementation 5 of the present disclosure.

Reference numerals: Lamp core holder; 10. Base; 11. Mounting column; 12. Positioning column; 13. Axial hole; 14. Radial hole; 15. Slot hole; 16. Ring-shaped protrusion; 17. Ring-shaped groove; 18. Ring-shaped reinforcing rib; 2. LED lamp board; 20. Through hole; 21. Solder joint; 3. Lead wire; 4, lamp holder; 5, through hole; 6, light-transmitting cover.

DETAILED DESCRIPTION

The following description will refer to the accompanying drawings of the embodiments of the present disclosure to clearly describe the technical solutions of the embodiments of the present disclosure. It should be noted that the embodiments described herein are merely some of the embodiments of the present disclosure and not all of them. All other embodiments obtained by those skilled in the art based on the embodiments of the present disclosure are within the scope of the present disclosure.

Implementation 1

The present embodiments provide a waterproof lamp head, including the following components.

A lamp core holder 1, arranged with an LED lamp board 2; where the lamp core holder 1 is further arranged with a lead wire 3, an end of the lead wire 3 passing through the lamp core holder 1 and being connected to the LED lamp board 2.

A lamp holder 4, integrally injection molded on an outer side of the lamp core holder 1 and on an outer side of the lead wire 3; where the lamp holder 4 defines a through hole 5 for the lead wire 3 to pass through.

A light-transmitting cover 6, ultrasonically welded to the lamp core holder 1; where a sealed space is defined between the light-transmitting cover 6 and the lamp core holder 1 to mount the LED lamp board 2.

The light-transmitting cover 6 and the lamp core holder 1 are made of fusible materials, and after ultrasonic welding, they can achieve waterproofing.

Additionally, the lamp holder 4 is connected to a lamp cover, which is configured to enclose the lamp core holder 1 and the light-transmitting cover 6. The lamp cover is connected to the lamp holder 4 via a threaded connection, meaning that the lamp holder 4 includes internal threads for connecting to the lamp cover, which is a well-known configuration and will not be further described here;

As can be seen from the embodiments, by integrally injection molding the lamp holder 4 on the outer side of the lamp core holder 1 and the outer side of the lead wire 3, water penetration through the base 10 into the lamp core may be effectively prevented, thereby ensuring reliable sealing and waterproof performance.

Additionally, the integrally molded lamp holder 4 enhances the structural stability of the lead wire 3, thereby ensuring the stability of the solder joint between the lead wire 3 and the LED lamp board 2. This may prevent the lead wire 3 from detaching from the LED lamp board 2 due to pulling, which could cause the lamp head to fail, thereby extending the service life of the lamp head.

Additionally, the light-transmitting cover 6 enhances the waterproof performance of the lamp head and provides effective protection for the LED lamp board 2 and the connection point between the LED lamp board 2 and the lead wire 3. The light-transmitting cover 6 is ultrasonically welded to the lamp core holder 1, thereby further ensuring waterproof performance while simplifying the production process and effectively improving production efficiency.

Implementation 2

The present embodiments provide a waterproof lamp head that, in addition to the technical solutions of the above embodiments, further includes the following technical features.

The lamp core holder 1 includes the following components.

A base 10.

A mounting column 11; where an end of the mounting column 11 is integrally formed on the base 10, and another end of the mounting column 11 is configured to mount the LED lamp board 2.

The end of the lead wire 3 passes through the base 10 and the mounting column 11 in sequence and is connected to the LED lamp board 2.

As can be seen from the embodiments, by integrally forming the mounting column 11 on the base 10 and connecting the lead wire 3 to the LED lamp board 2 after it passes through the base 10 and the mounting column 11 in sequence, the sealing performance and structural stability may be effectively ensured.

Additionally, the arrangement of the mounting column 11 may further enhance the mounting stability of the lead wire 3 and its stability during use, thereby preventing accidental disconnection between the lead wire 3 and the LED lamp board 2. Additionally, the mounting column 11 provides a guiding effect for the mounting of the lead wire 3, thereby improving the convenience and mounting accuracy of the lead wire 3.

Implementation 3

The present embodiments provide a waterproof lamp head that, in addition to the technical solutions of the above embodiments, further includes the following technical features.

The lamp core holder 1 further includes the following components.

A positioning column 12, integrally formed on the other end of the mounting column 11; where the LED lamp board 2 defines a through hole 20 matching the positioning column 12.

The positioning column 12 is fixedly connected to the LED lamp board 2 after hot melting.

Additionally, the positioning column 12 may be disposed on a center of the other end of mounting column 11.

As can be seen from the embodiments, the arrangement of the positioning column 12 may effectively enhance the mounting stability of LED lamp board 2. The application of hot melting to fix the LED lamp board 2 to the positioning column 12 may improve process convenience and production efficiency.

Additionally, positioning the positioning column 12 at the center of the end of the mounting column 11 may improve the balance of the LED lamp board 2 after mounting and thus enhance the convenience of placing the LED lamp board 2 at the end of the mounting column 11.

Implementation 4

The present embodiments provide a waterproof lamp head that, in addition to the technical solutions of the above embodiments, further includes the following technical features.

The mounting column 11 internally defines an axial hole 13 for the lead wire 3 to pass through and a radial hole 14 for the lead wire 3 to exit.

The axial hole 13 is coaxially arranged with the through hole 5.

As can be seen from the embodiments, by defining the axial hole 13 for the lead wire 3 to pass through and the radial hole 14 for the lead wire 3 to exit within the mounting column 11, the mounting and guidance of the lead wire 3 may be facilitated, and the lead wire 3 may be effectively stabilized after mounting, thereby ensuring the structural stability.

Additionally, the axial hole 13 and radial hole 14 may effectively enhance the fixation of the lead wire 3, further preventing accidental disconnection between the lead wire 3 and the LED lamp board 2. The coaxial arrangement of the axial hole 13 with the through hole 5 may avoid bending of the lead wire 3 after insertion, thereby preventing damage and ensuring the production yield of the lamp head.

Implementation 5

The present embodiments provide a waterproof lamp head that, in addition to the technical solutions of the above embodiments, further includes the following technical features.

The radial holes 14 are two in number and symmetrically inclined, with a smooth transition at the connection points with the axial hole 13.

As can be seen from the embodiments, by providing two radial holes 14 that are inclined and smoothly transitioning at the connection with the axial hole 13, the convenience of mounting the lead wire 3 may be improved, such that production and assembly efficiency may be enhanced. Further, the inclined radial holes 14 may prevent excessive bending of the lead wire 3, thereby avoiding damage to the lead wire 3.

Implementation 6.

The present embodiments provide a waterproof lamp head that, in addition to the technical solutions of the above embodiments, further includes the following technical features.

A surface of the mounting column 11 defines a slot hole 15 in communication with the through hole 5.

As can be seen from the embodiments, by defining the slot hole 15 on the surface of the mounting column 11 to mount the lead wire 3, the slot hole 15 may provide good guidance for the lead wire 3 and simplify the production process, thereby improving the ease of forming and effectively increasing production efficiency.

Additionally, the slot hole 15 may adapt to the bending condition of the lead wire 3, thereby improving the ease of soldering between the lead wire 3 and the LED lamp board 2.

Implementation 7

The present embodiments provide a waterproof lamp head that, in addition to the technical solutions of the above embodiments, further includes the following technical features.

A surface of the LED lamp board 2 near the mounting column 11 is arranged with a solder joint 21 for connecting to the lead wire 3.

As can be seen from the embodiments, by positioning the solder joint 21 on the surface of the LED lamp board 2 near the mounting column 11 for connecting to the lead wire 3, the LED lamp board 2 itself may shield the connection point where it is soldered to the lead wire 3, thereby enhancing aesthetic appeal and facilitating soldering between the lead wire 3 and the solder joint 21, and thus avoiding excessive bending of the lead wire 3 during mounting.

Implementation 8.

The present embodiments provide a waterproof lamp head that, in addition to the technical solutions of the above embodiments, further includes the following technical features.

The base 10 is arranged with a ring-shaped protrusion 16, and a ring-shaped groove 17 is defined on the ring-shaped protrusion 16.

An end of the light-transmitting cover 6 is embedded in the ring-shaped groove 17.

The ring-shaped protrusion 16 is integrally molded with the base 10 during a molding process.

As can be seen from the embodiments, the ring-shaped protrusion 16 and the ring-shaped groove 17 on the ring-shaped protrusion 16 serve as reinforcing ribs, effectively enhancing the structural strength of the base 10. Additionally, they facilitate improving the connection strength between the light-transmitting cover 6 and the base 10, as well as the sealing and waterproofing performance at the connection point, thereby preventing safety hazards or the service life of the light fixture being affected caused by water infiltrating into the light-transmitting cover 6.

Additionally, the ring-shaped protrusion 16 and the end of the light-transmitting cover 6 embedded in the ring-shaped groove 17 form multiple bent flow channels, which may effectively enhance the waterproof performance between the base 10 and the light-transmitting cover 6.

Implementation 9

The present embodiments provide a waterproof lamp head that, in addition to the technical solutions of the above embodiments, further includes the following technical features.

The end of the light-transmitting cover 6 disposed within the ring-shaped groove 17 is arranged with a ring-shaped reinforcing rib 18.

The ring-shaped reinforcing rib 18 and the light-transmitting cover 6 are formed integrally by injection molding.

As can be seen from the embodiments, the ring-shaped reinforcing rib 18 may effectively enhance the structural strength and stability of the connection between the light-transmitting cover 6 and the ring-shaped protrusion 16.

Implementation 10

The present embodiments provide a waterproof lamp head that, in addition to the technical solutions of the above embodiments, further includes the following technical features.

The waterproof lamp head is formed by the following operations.

1. Integrally injection-molding a lamp core holder 1.
2. Mounting a LED lamp board 2 on a positioning column 12, and performing hot melting on the positioning column 12 to fix the LED lamp board 2 to the mounting column 11.

3. Mounting a lead wire 3, by passing an end of the lead wire 3 sequentially through the base 10 and the mounting column 11, and connecting the end to the LED lamp board 2.
4. Placing the lamp core holder 1 with the lead wire 3 into a mold of a vertical injection molding machine, and integrally injection molding a lamp holder 4 around the lead wire 3 and the lamp core holder 1.
5. Welding a light-transmitting cover 6 to a ring-shaped groove of the lamp core holder 1 with an ultrasonic welding machine.

As can be seen from the embodiments, through the aforementioned forming operations, the LED lamp board 2 and the lead wire 3 are first installed on the lamp core holder 1, followed by the integral injection molding of the lamp holder 4 on the lamp core holder 1. Additionally, the light-transmitting cover 6 is fixedly connected to the base 10 via ultrasonic welding, thereby simplifying the production process and effectively improving production efficiency.

The above description of the embodiments of the present disclosure is provided with reference to the accompanying drawings. Unless otherwise specified, the embodiments and features of the embodiments in the present disclosure may be combined with each other. The present disclosure is not limited to the specific implementation methods described above. The specific implementation methods described above are merely illustrative and not restrictive. Those skilled in the art, having reference to the contents of the present disclosure, may make many modifications and changes to the apparatus, methods, and systems described herein without departing from the scope of the appended claims.

What is claimed is:

1. A waterproof lamp head, comprising:

a lamp core holder, arranged with an LED lamp board; wherein the lamp core holder is further arranged with a lead wire, an end of the lead wire passing through the lamp core holder and being connected to the LED lamp board;

a lamp holder, integrally injection molded on an outer side of the lamp core holder and on an outer side of the lead wire; wherein the lamp holder defines a first through hole for the lead wire to pass through; and a light-transmitting cover, ultrasonically welded to the lamp core holder; wherein a sealed space is defined between the light-transmitting cover and the lamp core holder to mount the LED lamp board;

wherein the lamp core holder comprises a mounting column; the mounting column internally defines an axial hole for the lead wire to pass through and a radial hole for the lead wire to exit;

the axial hole is coaxially arranged with the first through hole.

2. The waterproof lamp head according to claim 1, wherein the lamp core holder comprises:

a base;

wherein an end of the mounting column is integrally formed on the base, and another end of the mounting column is configured to mount the LED lamp board;

wherein the end of the lead wire passes through the base and the mounting column in sequence and is connected to the LED lamp board.

3. The waterproof lamp head according to claim 2, wherein the lamp core holder further comprises:

a positioning column, integrally formed on the other end of the mounting column; wherein the LED lamp board defines a second through hole matching the positioning column;

wherein the positioning column is fixedly connected to the LED lamp board after hot melting.

4. The waterproof lamp head according to claim 3, wherein a surface of the mounting column defines a slot hole in communication with the first through hole.

5. The waterproof lamp head according to claim 4, wherein a surface of the LED lamp board near the mounting column is arranged with a solder joint for connecting to the lead wire.

6. The waterproof lamp head according to claim 3, wherein the base is arranged with a ring-shaped protrusion, and a ring-shaped groove is defined on the ring-shaped protrusion;

an end of the light-transmitting cover is embedded in the ring-shaped groove.

7. The waterproof lamp head according to claim 6, wherein the end of the light-transmitting cover disposed within the ring-shaped groove is arranged with a ring-shaped reinforcing rib.

8. The waterproof lamp head according to claim 7, being formed by:

integrally injection-molding the lamp core holder;

mounting the LED lamp board on the positioning column, and performing hot melting on the positioning column to fix the LED lamp board to the mounting column;

mounting the lead wire, by passing the end of the lead wire sequentially through the base and the mounting column, and connecting the end to the LED lamp board;

placing the lamp core holder with the lead wire into a mold of a vertical injection molding machine, and integrally injection molding the lamp holder around the lead wire and the lamp core holder; and welding the light-transmitting cover to the ring-shaped groove of the lamp core holder with an ultrasonic welding machine.

9. The waterproof lamp head according to claim 3, wherein the positioning column is disposed on a center of the other end of mounting column.

10. The waterproof lamp head according to claim 1, wherein the radial hole comprises two radial holes that are symmetrically inclined, with a smooth transition at connection points with the axial hole.

11. The waterproof lamp head according to claim 10, wherein a surface of the LED lamp board near the mounting column is arranged with a solder joint for connecting to the lead wire.

12. The waterproof lamp head according to claim 1, wherein the light-transmitting cover and the lamp core holder are made of fusible materials.

13. A waterproof lamp head, comprising:

a lamp core holder, arranged with an LED lamp board; wherein the lamp core holder is further arranged with a lead wire, an end of the lead wire passing through the lamp core holder and being connected to the LED lamp board;

a lamp holder, integrally injection molded on an outer side of the lamp core holder and on an outer side of the lead wire; wherein the lamp holder defines a first through hole for the lead wire to pass through; and a light-transmitting cover, ultrasonically welded to the lamp core holder; wherein a sealed space is defined between the light-transmitting cover and the lamp core holder to mount the LED lamp board;

wherein the lamp core holder comprises a base; the base is arranged with a ring-shaped protrusion, and a ring-shaped groove is defined on the ring-shaped protrusion; an end of the light-transmitting cover is embedded in the ring-shaped groove.

14. The waterproof lamp head according to claim 13, wherein the end of the light-transmitting cover disposed within the ring-shaped groove is arranged with a ring-shaped reinforcing rib.

* * * * *